United States Patent
Cordes et al.

(10) Patent No.: US 6,817,761 B2
(45) Date of Patent: Nov. 16, 2004

(54) SCANNING HEAT FLOW PROBE

(75) Inventors: Steven Alan Cordes, Yorktown Heights, NY (US); David R. DiMilia, Wappingers Falls, NY (US); James Patrick Doyle, Bronx, NY (US); Matthew James Farinelli, Bronx, NY (US); Snigdha Ghoshal, Austin, TX (US); Uttam Shyamalindu Ghoshal, Austin, TX (US); Chandler Todd McDowell, Austin, TX (US); Li Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/420,063

(22) Filed: Apr. 21, 2003

(65) Prior Publication Data

US 2004/0028117 A1 Feb. 12, 2004

Related U.S. Application Data

(62) Division of application No. 10/022,162, filed on Dec. 17, 2001, now Pat. No. 6,679,625.

(51) Int. Cl.[7] .......................... G01K 7/02; G01N 25/20; G01N 25/18
(52) U.S. Cl. ............................ 374/179; 374/43; 374/44
(58) Field of Search .............................. 374/1, 29, 30, 374/179, 43, 44

(56) References Cited

U.S. PATENT DOCUMENTS

| | | | | |
|---|---|---|---|---|
| 3,753,373 | A | | 8/1973 | Brown ...................... 73/398 C |
| 3,881,181 | A | * | 4/1975 | Khajezadeh ................ 374/178 |
| 4,830,515 | A | | 5/1989 | Cortes ........................ 374/208 |
| 4,881,185 | A | | 11/1989 | Murakami et al. .......... 364/557 |
| 4,960,975 | A | | 10/1990 | Weinbrecht ................. 219/241 |
| 5,388,323 | A | | 2/1995 | Hopson et al. ............... 27/595 |
| 5,441,343 | A | * | 8/1995 | Pylkki et al. ................ 374/137 |
| 5,675,118 | A | | 10/1997 | Körtvélyessy ................ 705/26 |
| 5,838,005 | A | | 11/1998 | Majumdar et al. .......... 250/306 |
| 5,929,438 | A | | 7/1999 | Suzuki et al. ............... 250/306 |
| 5,969,238 | A | | 10/1999 | Fischer ........................ 73/105 |
| 5,986,261 | A | | 11/1999 | Lewis et al. ................ 250/306 |
| 6,123,675 | A | | 9/2000 | Kreizman et al. .......... 600/549 |
| 6,190,035 | B1 | | 2/2001 | Smith .......................... 374/31 |
| 6,389,886 | B2 | * | 5/2002 | Daniels et al. ................ 374/45 |
| 6,467,951 | B1 | * | 10/2002 | Ghoshal ...................... 374/45 |
| 6,487,515 | B1 | | 11/2002 | Ghoshal ..................... 702/136 |
| 6,491,425 | B1 | * | 12/2002 | Hammiche et al. .......... 374/43 |
| 6,518,872 | B1 | * | 2/2003 | Edinger et al. ............... 338/25 |
| 6,566,650 | B1 | * | 5/2003 | Hu et al. ..................... 250/281 |
| 6,593,760 | B2 | * | 7/2003 | Jeong et al. .................. 374/43 |
| 6,608,307 | B1 | * | 8/2003 | Baur .......................... 250/306 |
| 2002/0095243 | A1 | * | 7/2002 | Ghoshal ..................... 700/299 |
| 2003/0081651 | A1 | | 5/2003 | Gianchandani et al. ..... 374/185 |
| 2004/0028119 | A1 | * | 2/2004 | Takahashi et al. .......... 374/208 |

FOREIGN PATENT DOCUMENTS

| | | | | |
|---|---|---|---|---|
| JP | 05052783 A | * | 3/1993 | .......... G01N/25/18 |
| JP | 2001004455 | | 1/2001 | ............ G01K/7/18 |

* cited by examiner

Primary Examiner—Diego Gutierrez
Assistant Examiner—Mirellys Jagan
(74) Attorney, Agent, or Firm—Duke W. Yee; Casimer K. Salys; Patrick C. R. Holmes

(57) ABSTRACT

A scanning heat flow probe for making quantitative measurements of heat flow through a device under test is provided. In one embodiment the scanning heat flow probe includes an electric current conductor in a cantilever beam connected to a probe tip and coupled to two voltmeter leads. The probe also includes two thermocouple junctions in the cantilever beam electrically isolated from the electric current conductor and the two voltmeter leads. Heat flow is derived quantitatively using only voltage and current measurements. In other forms, the invention relates to the calibration of scanning heat flow probes through a method involving interconnected probes, and relates to the minimization of heat flow measurement uncertainty by probe structure design practices.

4 Claims, 11 Drawing Sheets

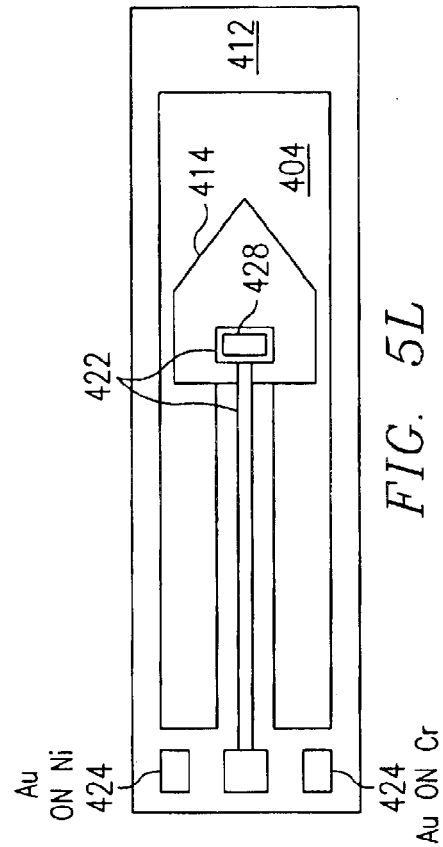
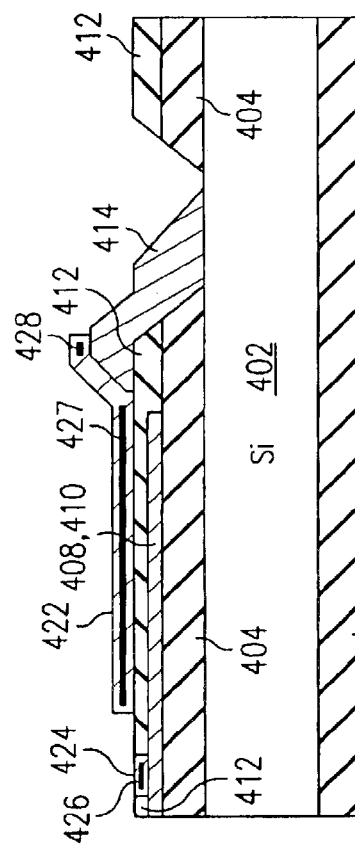
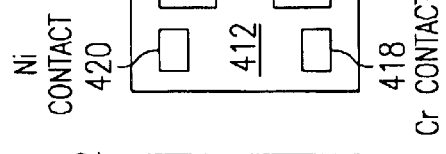
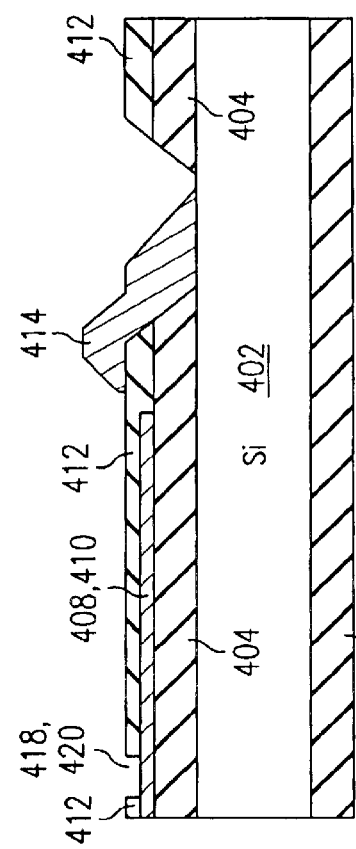

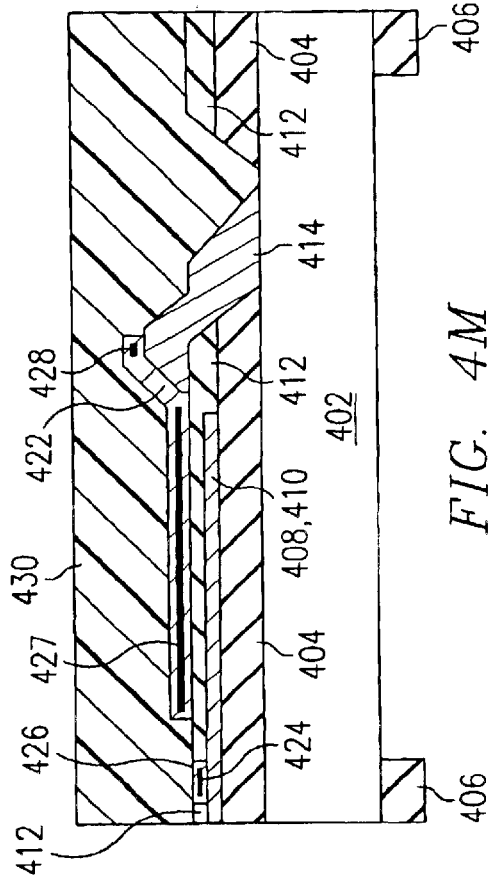
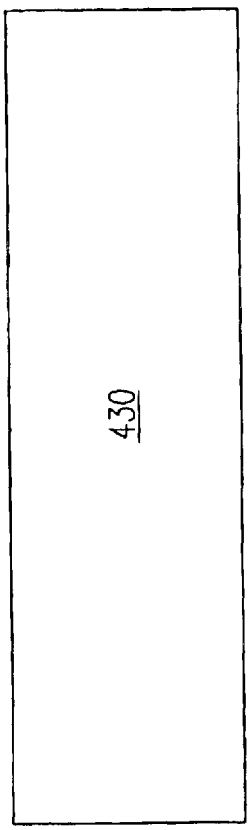
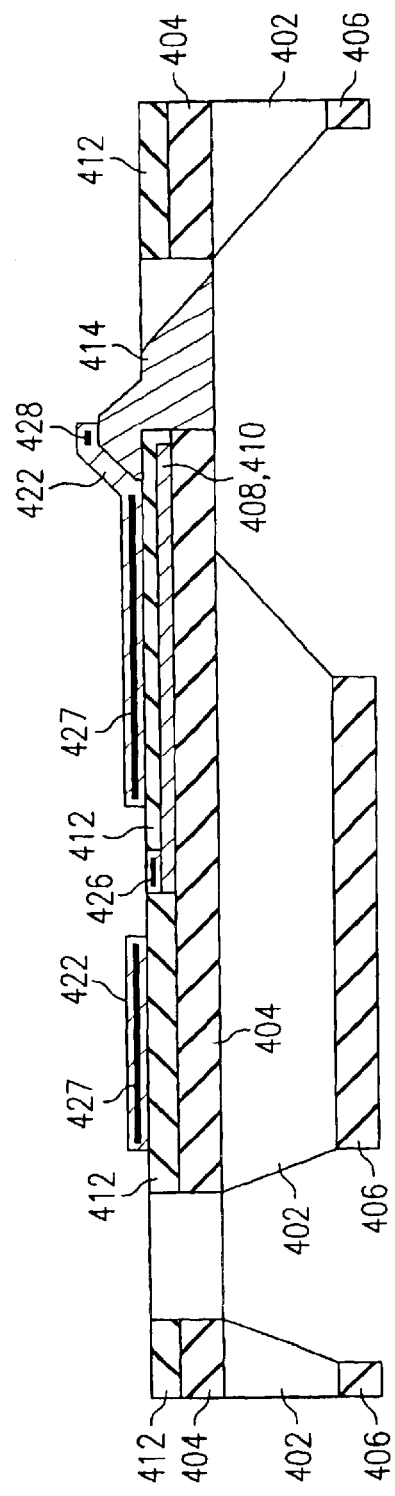
FIG. 5M
FIG. 4M
FIG. 4N

US 6,817,761 B2

SCANNING HEAT FLOW PROBE

This application is a divisional of application Ser. No. 10/022,162, filed Dec. 17, 2001, now U.S. Pat. No. 6,679,625.

BACKGROUND OF THE INVENTION

1. Technical Field

The present invention is directed to an apparatus for measuring heat flow and methods related to the fabrication and calibration of such apparatus.

2. Description of Related Art

One of the major difficulties in developing novel thin film thermoelectric materials lies in obtaining consistent and accurate measurement of their thermal and electrical properties. Traditional methods cannot be easily extended to microscopic characterization because of increased electrical and thermal parasitic losses associated with the probes used to perform the measurements. Additionally, the poor structural stability of some of the novel materials being investigated makes using traditional probe methods unworkable.

For example, in the case of measurements using a probe, such as the "ZT-meter," the time-scales of the transients become short and introduce errors in the electrical measurements. Scanning thermoelectric microscopy (STEM) based on atomic force microscope (AFM) probes are capable of performing measurements of thermal and electrical properties of thermoelectric materials at these small scales. However, STEM based on AFM probes still have several limitations. For example, present probes only give qualitative measurements of heat flow, which only allows one to determine whether there is more or less heat flow with one material versus another. Therefore, it would be desirable to have a scanning heat flow probe that allows quantitative measurements of heat flow to be made.

SUMMARY OF THE INVENTION

The present invention provides a scanning heat flow probe for making quantitative measurements of heat flow through a device under test. In one embodiment the scanning heat flow probe includes an electric current conductor in a cantilever beam connected to a probe tip and coupled to two voltmeter leads. The probe also includes two thermocouple junctions in the cantilever beam electrically isolated from the electric current conductor and the two voltmeter leads. Heat flow is derived quantitatively using only voltage and current measurements. In other forms, the invention relates to the calibration of scanning heat flow probes through a method involving interconnected probes, and relates to the minimization of heat flow measurement uncertainty by probe structure design practices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and apparatus for measuring and characterizing the thermal and electrical properties of the materials. The invention as embodied herein makes use of temperature and voltage sensors with a thermal probe to quantitatively measure heat flow through a tip of the probe. Also included is an electric conductor connected to the probe tip to allow for electrical stimulation of the sample.

Figure 1:
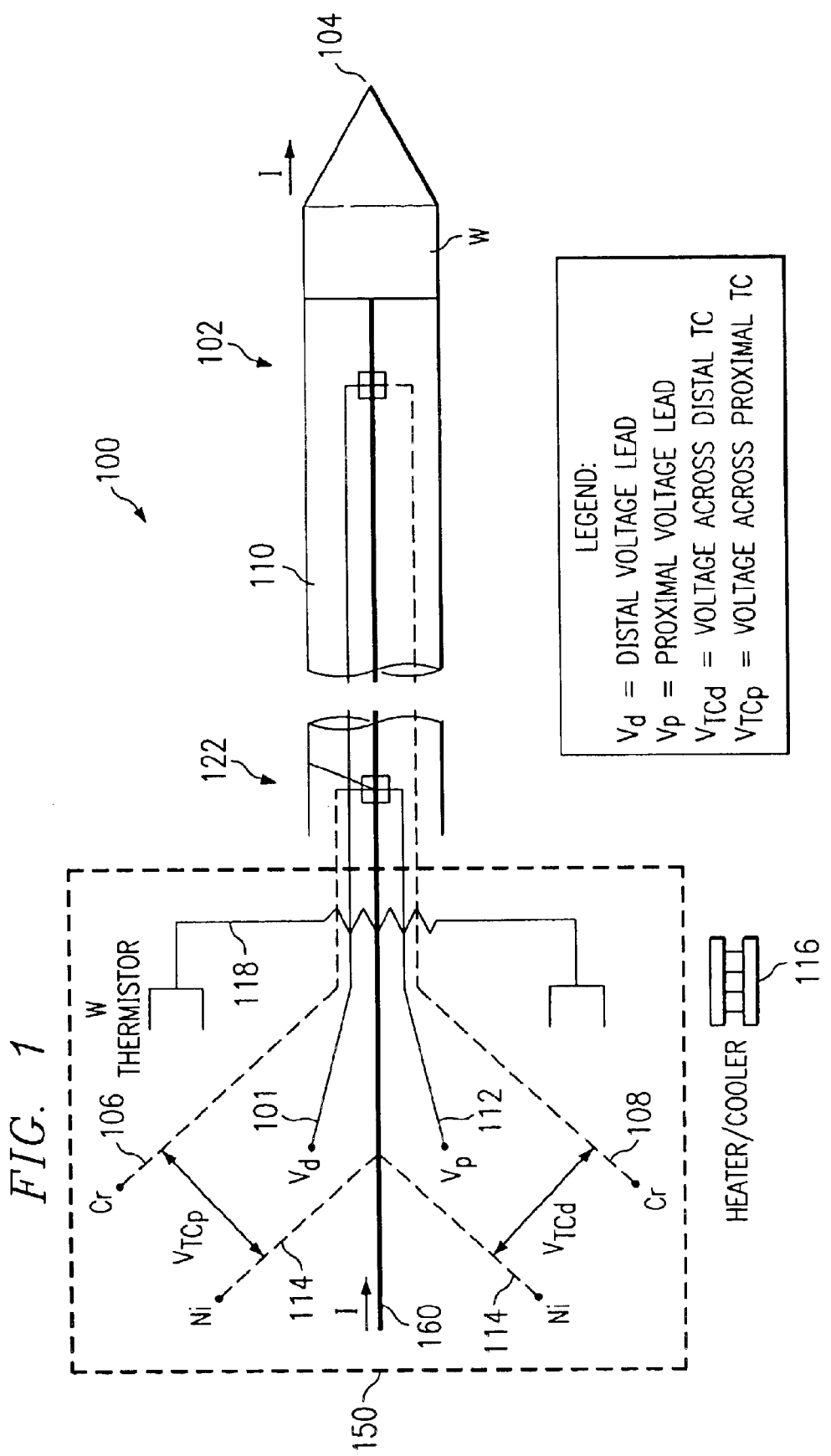
FIG. 1 is an exemplary cross-sectional view of the scanning thermoelectric microscopy probe in accordance with the present invention.

Referring now to FIG. 1, an diagram illustrating an exemplary scanning heat flow probe 100 is depicted in accordance with the present invention. The probe shown in FIG. 1 is used to measure the thermal properties of materials in a manner described in detail hereafter.

Figure 2:
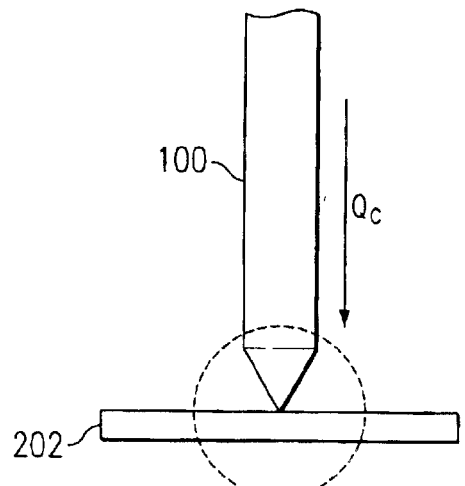
FIG. 2 depicts a schematic diagram illustrating heat flow through a probe to a sample in accordance with the present invention.

The probe 100 includes a probe body 150, a cantilever structure 110, a first temperature sensing lead 106, a second temperature sensing lead 108, a first voltage sensing lead 101, a second voltage sensing lead 112, a current lead 160, a thermistor 118, and a probe tip 104. A heater/cooler 116, such as a thermoelectric heater/cooler (TEC), may also be thermally coupled to probe 100 in order to control the background temperature, of the probe 100. The leads 106, 108, and 114 create two thermocouples at points 102 and 122 in cantilever 110 which are used to calibrate probe 100 in a manner to be described hereafter, to permit quantitative measurement of the heat flow through the probe tip 104 into sample 202 as in FIG. 2.

Figure 1A:
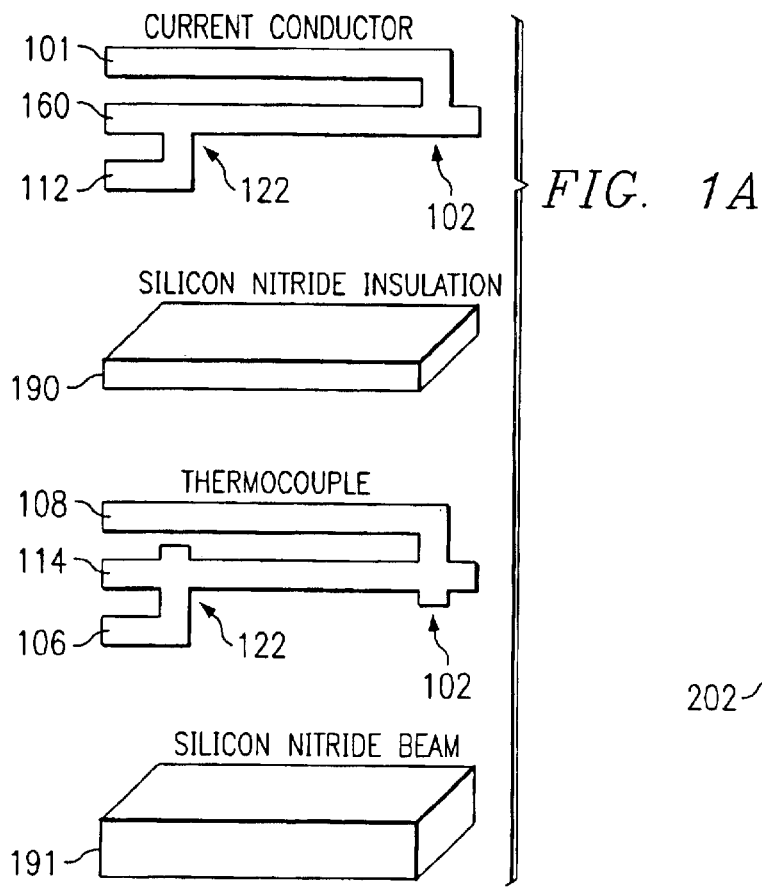
FIG. 1A depicts an schematic diagram of an exploded view of the components of the probe cantilever in accordance with the present invention.

Referring to FIG. 1A, electrical current flows through probe 100 via current conductor 160. Voltage readings are taken at points 102 and 122 of current conductor 160 through leads 101 and 112. The current conductor 160 is separated from the thermocouple leads 106, 108, and 114 by an electrical insulator 190, such as, for example, silicon nitride. The distance between the proximal thermocouple at 122 and the distal thermocouple at 102 is typically between 100 and 900 microns. The distal thermocouple at 102 measures the temperature near the tip 104 using leads 108 and 114. A differential thermocouple formed from the proximal thermocouple at 122, and the distal thermocouple at 102 using leads 108 and 106, measures the temperature drop along the beam. In one embodiment, cantilever lid has a width of approximately 8 microns. In one embodiment, the probe tip 104 may be constructed from tungsten. A TEC heater/cooler 116 may be thermally coupled to the scanning heat flow probe 100 to bias the temperature at 122. By varying the temperature at 122, the heat flow through the probe can be adjusted to a desired value, including zero.

In some preferred embodiments, the probe includes a radiation shield surrounding but not contacting the probe cantilever 110 from points 122 to 102 to mitigate radiation effects. Also, the probe and sample should be used in vacuum to mitigate gaseous convection/conduction effects.

While the probe structure shown in FIG. 1 shows a sharp probe tip, the probe tip may be of any shape desirable. For example, the cone-shaped probe tip may be very narrow or very wide in diameter, may have any value interior angle at the tip, and the like.

Calibration

In order to measure heat flow accurately, the probe 100 must be calibrated. In designing and calibrating the probe 100, one goal is the minimization of error in the probe in order for the probe to provide accurate measurements of heat flow in a sample. In order to do this, the error in the heat flow, Q, through the probe should be minimized as much as possible.

Figure 2A:
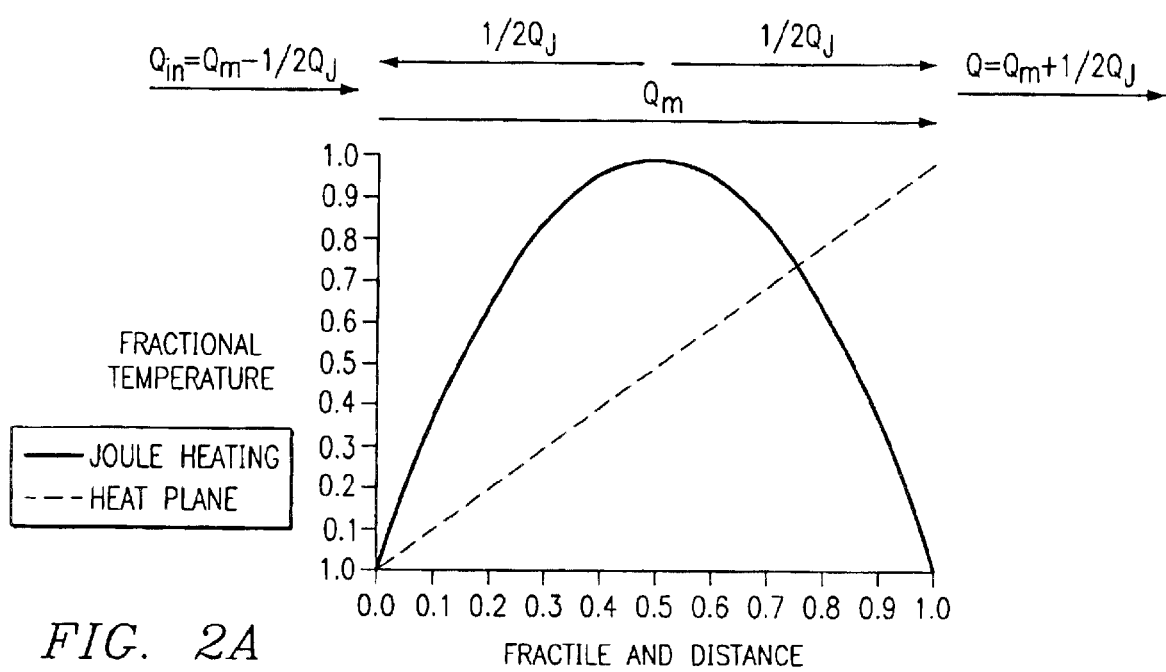
FIG. 2A depicts a schematic diagram illustrating heat flow through the probe.

As depicted in FIG. 2A, the heat flow through the probe cantilever 110 may be characterized by two components: a component, $Q_j$, due to joule heating from current flowing through the electrical conductor 160 and a component, $Q_m$, due to the temperature gradient across the probe cantilever 110 between points 122 and 102.

The joule heating component, $Q_j$, may be measured from the voltage across the current conductor 160 with leads 101 and 112, and a measurement of the current through the current conductor 160. For purposes of calibration, it is accepted that one half of the heat for a uniform structure, $Q_j$, generated by joule heating flows toward the distal end of the probe 100 and one half flows toward the proximal end of the probe 100.

Thus, heat flow, Q, through the probe 100 into the sample is given by the following relation:

$$Q = Q_m + \tfrac{1}{2} Q_j.$$

Since $Q_m$ is related to the temperature gradient across the probe, $\Delta T$, and to the thermal resistivity, $R_{th}$, by the following equation:

$$Q_m = \Delta T / R_{th},$$

and since the heat flow due to joule heating is given by the relationships described above, the heat flow Q is given by the following relationship:

$$Q = \Delta T / R_{th} + \tfrac{1}{2} I V_e$$

where $V_e$ is the voltage across the current conductor 160 between points 122 and 102 in the cantilever 110. The temperature across gradient may be expressed as $V_{th}/\alpha$ where $V_{th}$ is the difference between the voltage across the distal thermocouple ($V_{TCd}$) and the voltage across the proximal thermocouple ($V_{TCp}$) and $\alpha$ is the Seebeck coefficient across the junction of the differential thermocouple. Thus, Q may be represented by the following relationship:

$$Q = V_{th}/(\alpha R_{th}) + \tfrac{1}{2} I V_e$$

Therefore, the uncertainty, $\sigma Q$, in the heat flow may be expressed as:

$$(\sigma Q)^2 = Q_m{}^2 [(\sigma V_{th}/V_{th})^2 + (\sigma \alpha R_{th}/\alpha R_{th})^2] + (\tfrac{1}{2} Q_j)^2 [(\sigma V_e/V_e)^2 + (\sigma I/I)^2]$$

This introduces four error terms: the error in the thermocouple voltage measurement, $\sigma V_{th}$, the error in the calibration of $\alpha R_{th}$, $\sigma \alpha R_{th}$, the error in the current conductor voltage measurement $\sigma V_e$, and the error in the measurement of the current through the current conductor, $\sigma I$. However, three of these terms are determinable from the tolerances provided with the commercially available instruments utilized to make the voltage and current measurements. This leaves only the uncertainty in $\alpha R_{th}$ to be determined.

Figure 3A:
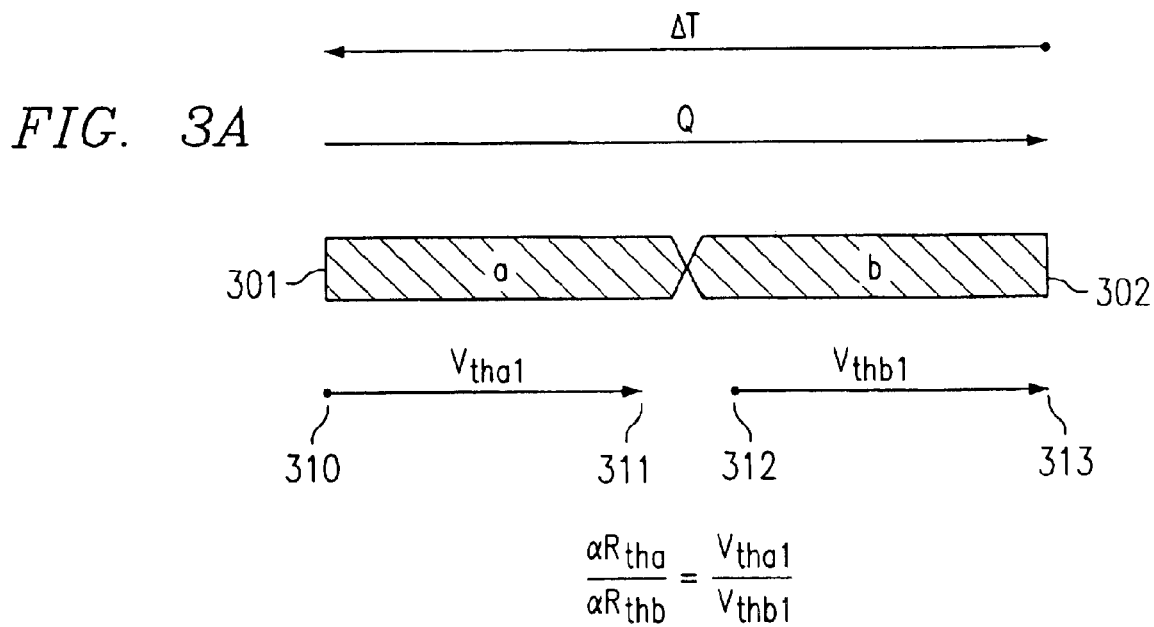
FIGS. 3A–3B depict schematic diagrams of the calibration procedure in accordance with the present invention.
Figure 3B:
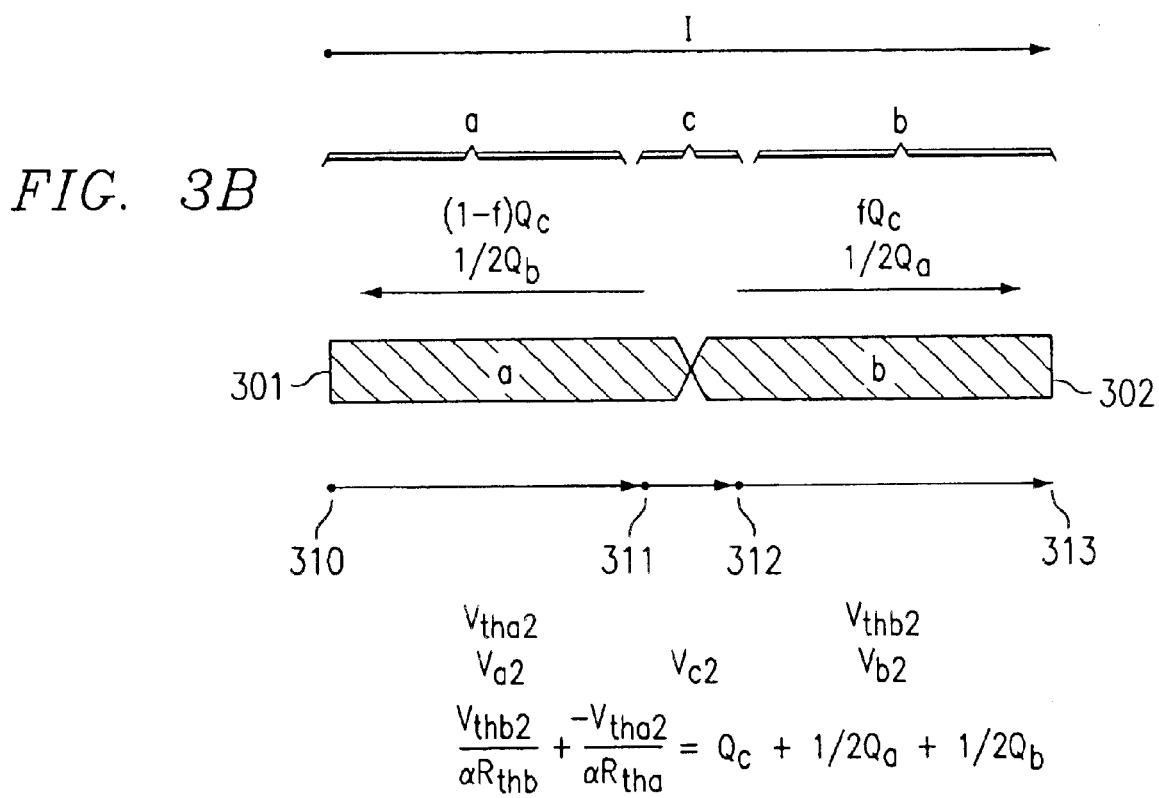

In order to determine the uncertainty in $\alpha R_{th}$, the calibration method of the present invention utilizes two scanning heat flow probes as depicted schematically in FIGS. 3A–3B. In FIG. 3A, two scanning heat flow probes 301 and 302 are oriented such that their tips touch. The probes are shown oriented linearly in FIGS. 3A–3B, however, the particular orientation between the two probes is not important. In step 1, a temperature gradient $\Delta T$ is created across the two probes by, for example, heating one probe with a heater. The temperature gradient induces a heat flow, Q, from one probe 301 to the other probe 302 as depicted in FIG. 3A. The voltages $V_{tha1}$ and $V_{thb1}$ of the two differential thermocouples in probes 301 and 302 are measured. Since the heat flow through the two probes is equal:

$$\alpha R_{tha}/\alpha R_{thb} = V_{tha1}/V_{thb1}.$$

The second step is depicted in FIG. 3B. In FIGS. 3B, the same two probes are used though they need not be in the exact same configuration. A current, I, is passed from probe 301 into probe 302 with voltage measurements made at points 310–313 using voltage leads 101 and 112 of each probe 301, 302. It is assumed that one half of the heat produced by joule heating in probe 301 passes into probe 302 and that one half of the heat produced by joule heating in probe 302 passes into probe 301. There is also joule heating produced by the current I passing from probe 301 to probe 302 in the region between points 311 and 312. However, since this section includes portions of both probes, no assumptions are made about how much of this heat passes through probe 301 and how much passes through probe 302. Therefore, a fraction, $fQ_c$, of the heat, $Q_c$, produced by joule heating in region c passes into probe 302 and the remaining fraction of Qc (i.e. $(1-f)Q_c$) passes into probe 301. Furthermore, since the current flowing through the two probes is equal, the following relation may be determined:

$$V_{thb2}/\alpha R_{thb} + (-V_{tha2}/\alpha R_{tha}) = Q_c + \tfrac{1}{2} Q_a + \tfrac{1}{2} Q_b$$

Therefore, since there are now two equations, $\alpha R_{th}$ can be isolated for one of the probes. Thus, the following equation may be obtained for probe a:

$$\alpha R_{tha} = ((V_{tha1}/V_{thb1}) V_{thb2} - V_{tha2})/(I(V_c + \tfrac{1}{2} V_a + \tfrac{1}{2} V_b))$$

Thus, the uncertainty in $\alpha R_{tha}$ (i.e. $\sigma \alpha R_{tha}$) depends only upon measurable quantities (e.g., I and V). Thus, the uncertainty in the heat flow through the probe depends entirely on measurable quantities.

Probe Formation Process

Figure 4A:
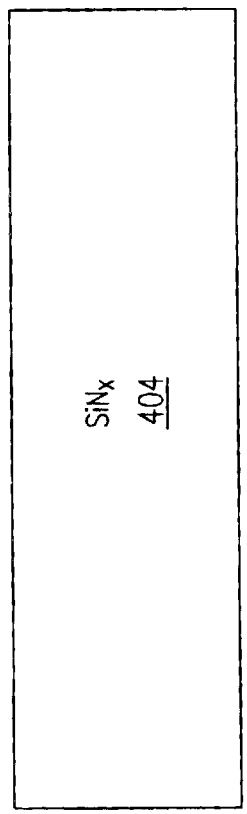
FIGS. 4A–4N are exemplary cross sections illustrating a process of fabricating the scanning heat flow probe in accordance with the present invention.
Figure 5A:
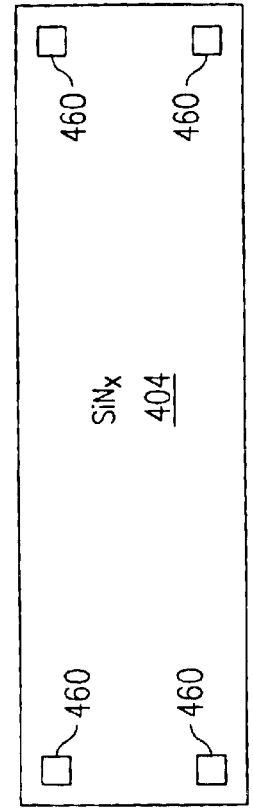
FIGS. 5A–5N are exemplary top views illustrating a process of fabricating the scanning heat flow probe in accordance with the present invention.
Figure 5C:
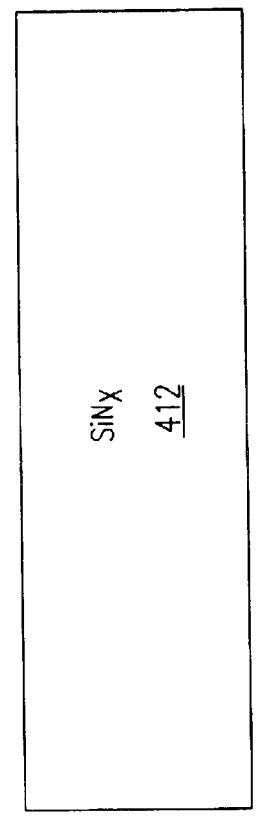
Figure 5D:
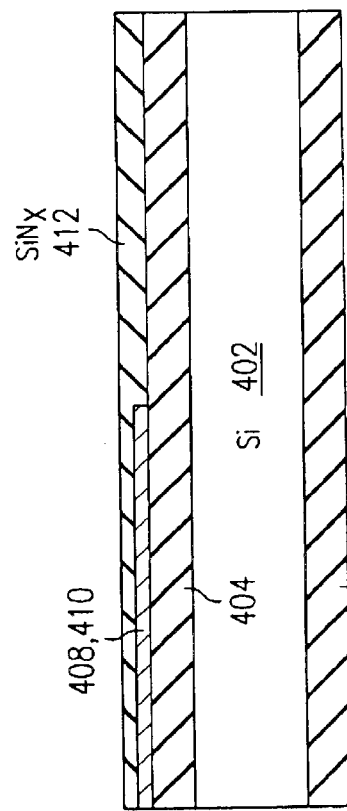
Figure 5E:
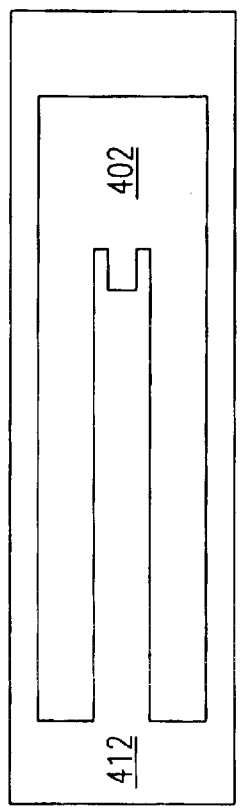
Figure 5F:
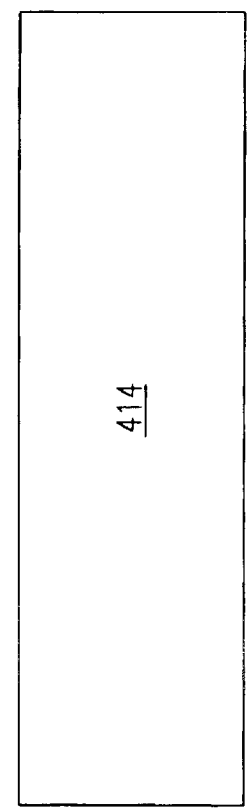
Figure 5G:
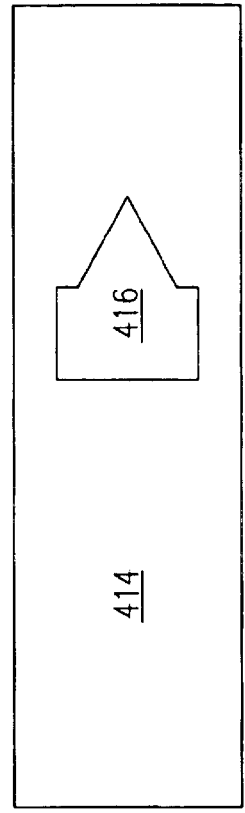
Figure 5H:
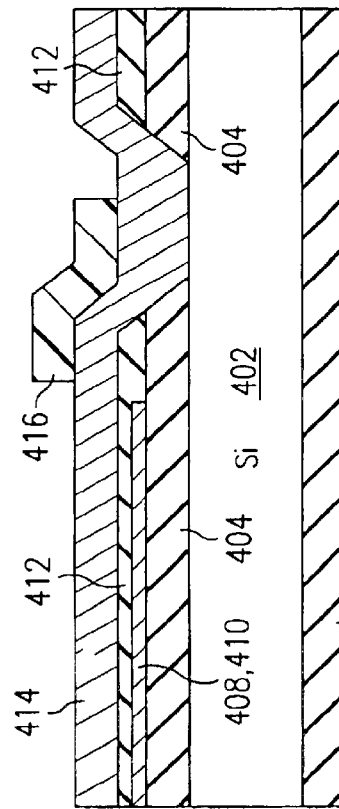
Figure 5I:
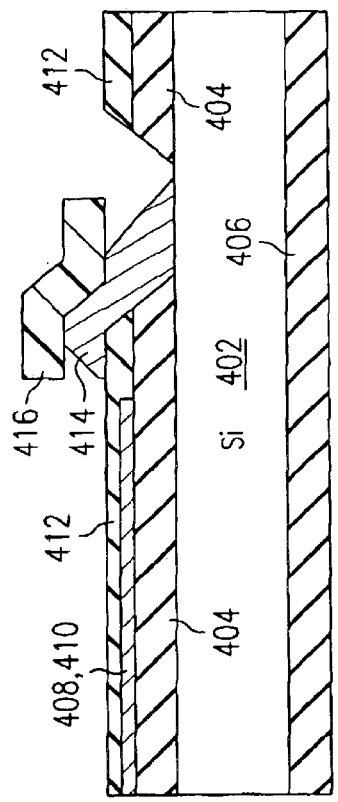
Figure 5J:
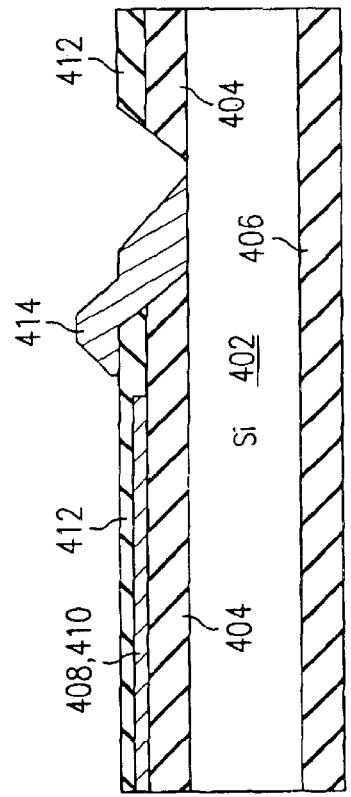
Figure 5N:
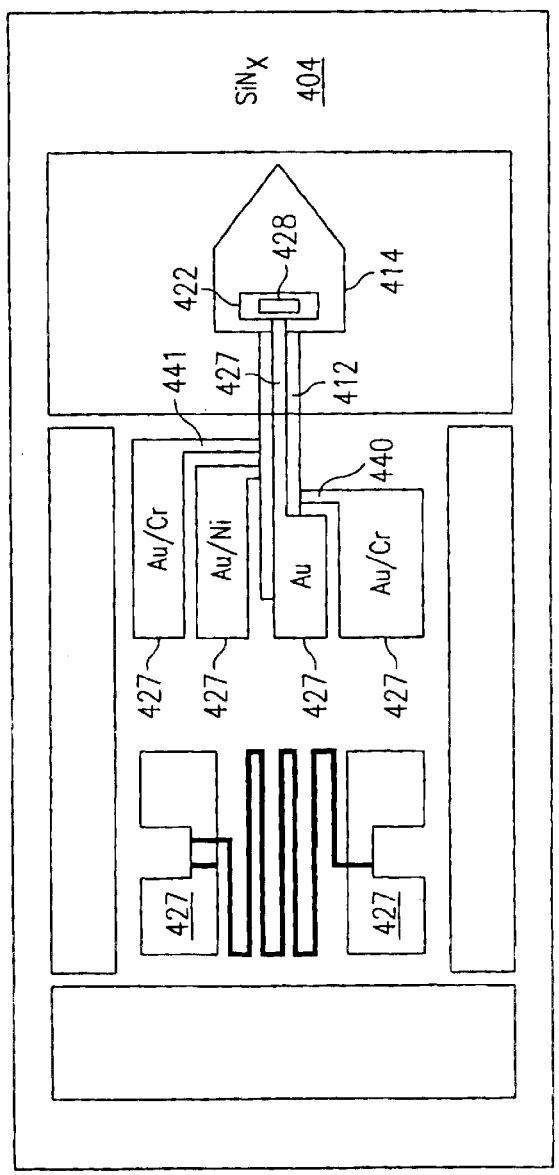

FIGS. 4A–4N are exemplary cross sections illustrating a process of fabricating the scanning heat flow probe 100 and FIGS. 5A–5N are exemplary corresponding top views in the process of fabricating the scanning heat flow probe 100. The scanning heat flow probe 100 is comprised of a number of different layers of material. The particular materials described hereafter with reference to the exemplary embodiment are meant to be for illustrative purposes and other materials having similar properties may be used in replacement or in addition to the materials described herein without departing from the spirit and scope of the present invention.

The formation of the scanning heat flow probe 100 will now be described with reference to FIGS. 4A–4N and 5A–5N. The mechanisms used to create the various layers of the probe, such as deposition and etching, are generally known in the art of semiconductor chip manufacture. However, these mechanisms have not previously been used to create the structure herein described.

Figure 4B:
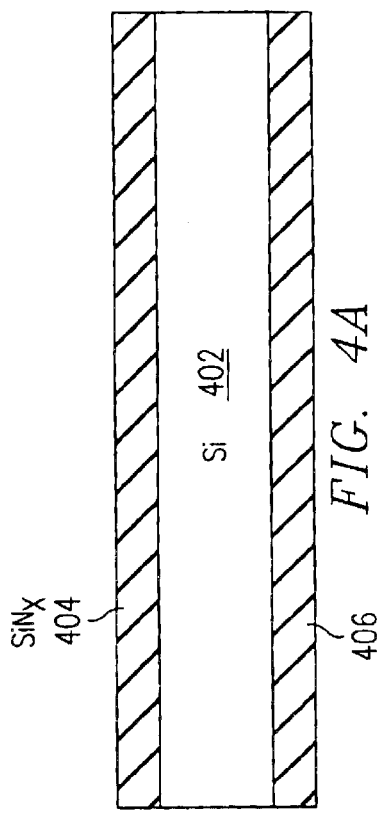
Figure 5B:
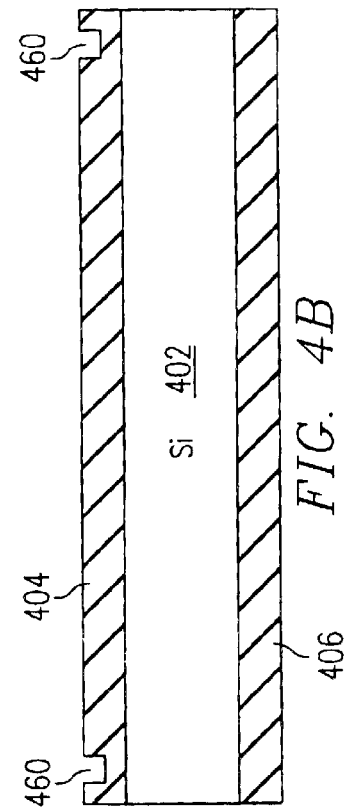

The process starts with a silicon wafer 402 sandwiched between two polished silicon nitride layers 404 and 406. The topside silicon nitride layer 404 which will in part form beam 191 (FIG. 1A) is selectively etched, for example by a reactive ion etch (RIE), to remove a portion of the silicon nitride as depicted in FIG. 4B for front-back alignment marks 460. For ease of illustration, the alignment marks 460 are not depicted in the next few sets of diagrams.

Figure 4C:
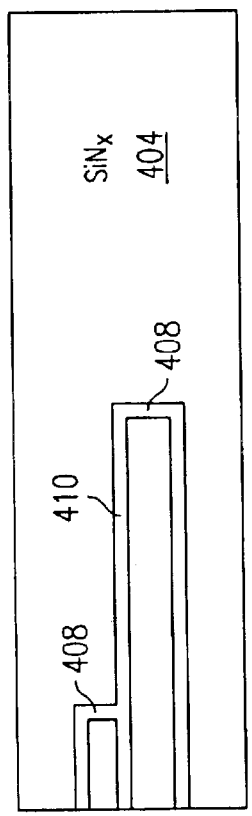
Figure 4D:
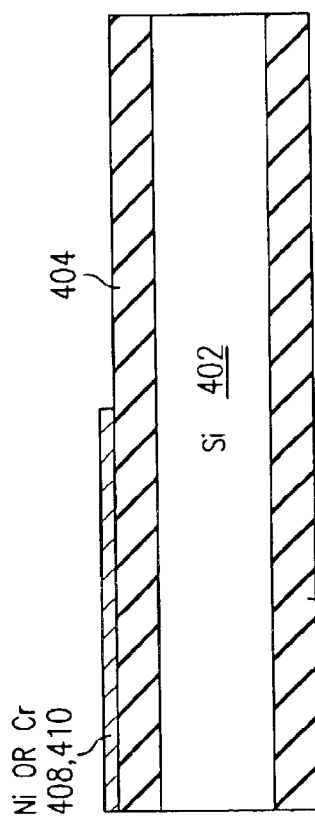

Next, using two separate masks, nickel 410 and chromium 408 leads are deposited onto silicon nitride 404 as depicted in FIGS. 4C and 5C. Preferably, the chromium leads 408 are approximately 60 nm thick and the nickel 410 leads are approximately 80 nm thick over 3 nm of chromium. A layer of silicon nitride 412 is then deposited over the chromium 408 and nickel 410 layers as well as over the remaining original silicon nitride layer 404 as depicted in FIGS. 4D and 5D by, for example, a PECVD process.

Figure 4E:
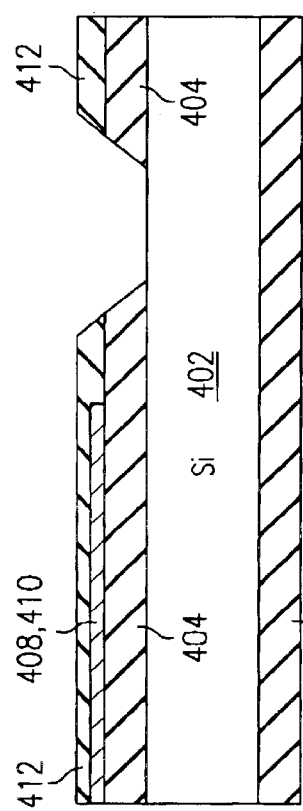
Figure 4F:
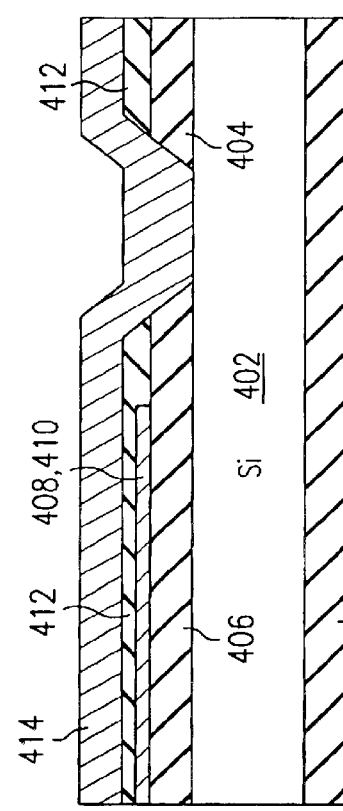
Figure 4G:
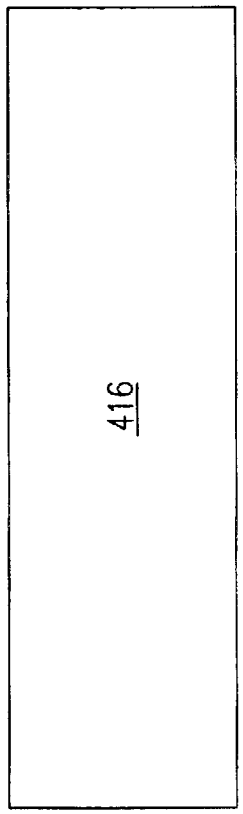
Figure 4H:
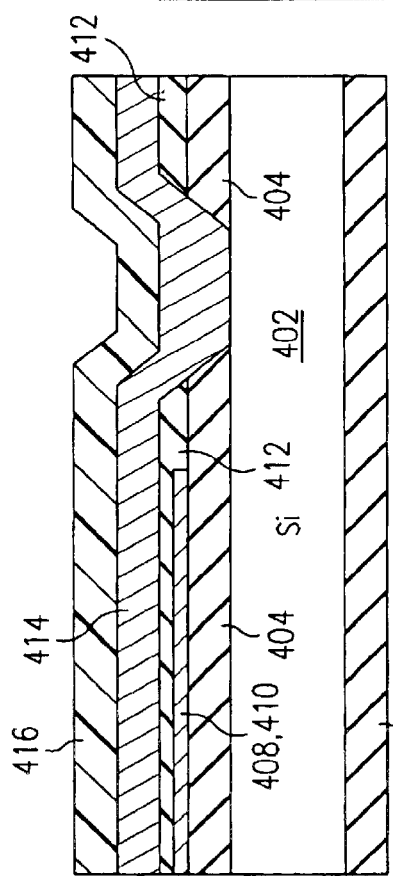

The resulting structure is then masked and a reactive ion etch is used to pattern the silicon nitride cantilever as depicted in FIGS. 4E and 5E. Next a tungsten (W) layer 414 is sputtered onto the exposed surface of the structure, preferably to a thickness of 2 microns resulting in a structure as depicted in FIGS. 4F and 5F. Next a layer of thick photoresist 416, such as, for example, AZ or Shipley, is formed over the structure by spinning resulting in the structure as depicted in FIGS. 4G and 5G. Preferably the photoresist 416 is spun to a thickness of 3 microns. The photoresist 416 is then patterned into the tip shape as depicted in FIGS. 4H and 5H.

Figure 4I:
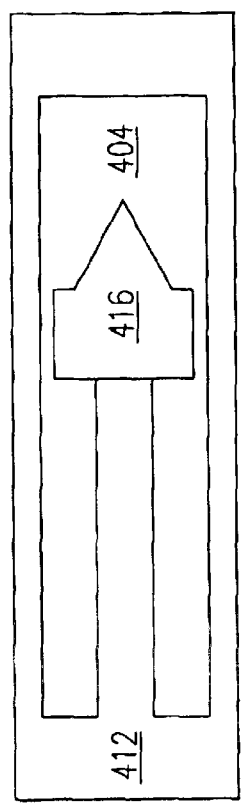
Figure 4J:
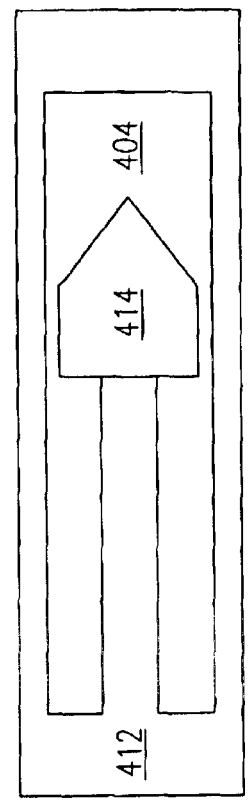

Next, a wet etch is performed on the W layer 414 undercutting the photoresist pattern 416 resulting in a structure as depicted in FIGS. 4I and 5I. Next, the photoresist 416 is stripped resulting in a structure as depicted in FIGS. 4J and 5J. The structure is then masked and the PECVD silicon nitride 412 is etched over the nickel and chromium contacts 418, 420 resulting in the structure depicted in FIGS. 4K and 5K. The structure is then masked again and the gold contacts 422 and 424 are formed to the tungsten, nickel, chromium and resistor lines 426–428 as depicted in FIGS. 4L and 5L. Next, another mask is utilized to pattern the backside silicon nitride 406. RIE results in the structure as depicted in FIGS. 4M and 5M. After a final bulk silicon etch in KOH, the final resulting structure is formed as depicted in FIGS. 4N and 5N.

The probe created using the process described above can be used for making measurements in many different applications. The probe may be used to measure thermoelectric properties of nano-scale structures, profiling of silicon dopants of semiconductor materials, characterizing giant magneto-resistive heads, and the like. The present invention is not limited to any one application of the probe and is intended to cover all possible applications to which the probe may be made. Those of ordinary skill in the art will appreciate that the probe of the present invention is preferably utilized along with a computing system in which the calibration and computations described above and hereafter are performed. The probe is used to provide measured quantities which are then processed by the computing system to calibrate the probe and generate values for the heat flow properties of the materials under test.

Method for Optimizing Design of Probe

In designing the probe, a method for determining a substantially optimum design for the probe in accordance with the present invention may be used. This method determines, for example, the optimum length of the probe cantilever, given the operational parameters under which the probe is intended to be used as well as the values of other parameters already chosen. This method of the current invention is a method for exploring the design space of a scanning heat flow probe and selecting the design parameters that minimize the errors in probe measurement, specifically the uncertainty in heat flow through the probe.

Method Overview

An equation describing the heat, Q, flowing through the probe is formed. This equation is based upon 1 Design parameters (values, no uncertainties)
   o1 material properties/composition
      §1 electrical resistance
      §2 thermal conductivity
      §3 Seebeck coefficient
   o2 Geometries
      §1 beam width/length
      §2 Metal width/thickness
      §3 Thermocouple width/thickness
   o3 Configuration
      §1 Implied in the thermal and electrical networks 2 Measurement environment (values, no uncertainties)
   o1 Heat flow, Q, through the probe
   o2 Current through the probe 3 Calibration conditions (values, no uncertainty)
   o1 Two step/two probe method
   o2 Calibration temperature difference
   o3 Calibration current
   o4 Contact resistance 4 Measurement equipment (uncertainties)
   o1 Manufacturer stated uncertainty in the measurement for the given operational point All the stated values, while not exact to the usage condition, are to place the probe in a certain operational range. The sole source of uncertainty is from the measurement equipment. Variation in the operational conditions of the probe will have an effect on the optimal probe design parameters, but this is a second order effect. Large deviations in operating conditions will substantially change the optimal design parameters and lead to degraded performance. This leads to the use of different probes for different operational conditions, just as a multi-meter changes ranges to improve performance.

Any probe will not be used in the exact operational range that determined the probes design parameters, but this is not cause for the performance of the probe to become suspect. When an actual measurement is made, the instrument measurements are entered into the heat flow equation yielding a heat flow based on measured values, no design parameters or constants. The calibration parameters are derived from measured values so they do not invalidate the previous statement. The uncertainty of the heat flow is also based on measured values and the manufacturers stated uncertainties of the measurement equipment.

So probe design and use come in two phases. In the design phase every parameter is chosen or derived from chosen values. The design parameters are varied, namely length, and the design parameters are chosen such that error in the measurement of the heat flow is minimized. In the second phase all design parameters are forgotten, and the heat flow and uncertainty are based on measured values and the manufacturers stated uncertainty for the equipment.

Equations

Figure 6:
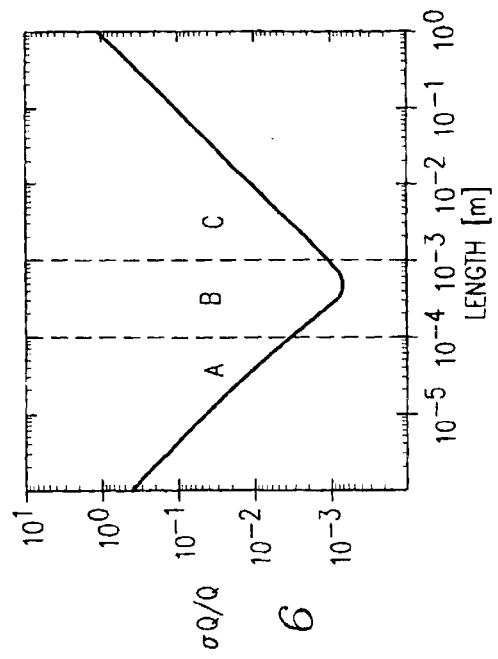
FIG. 6 depicts an example of a graph of fractional heat flow uncertainty versus probe length in accordance with the present invention.

The following list of equations may be simplified to a single equation expressing the uncertainty on the measurement of the heat flow through the probe. Any parameter can be varied, though length of the probe is most common, and a curve of uncertainty vs. that parameter can be formed. From this curve an optimal range for that design parameter can be chosen. An example of a graph of length of probe versus uncertainty in accordance with the present invention is depicted in FIG. 6. Good results for probe performance may be obtained using a cantilever beam having a length falling in region B. The increase in uncertainty for lengths smaller than this in region A is due to instrumentation uncertainty since such lengths result in smaller temperature gradients thereby becoming almost unmeasurable by the instrumentation. The increase in uncertainty for lengths in region C result from increase joule heating because of the increased length of the cantilever beam.

While this method is not sophisticated like a global error minimization it turns out that most of the parameters should be maximized or minimized individually and there is no system level trade off. For the length of the beam there is a system level trade off.

A longer beam produces a large temperature drop for a given heat flow making the thermocouple voltage easier to measure. This is true up to a point. Over some range the voltmeter has a fairly flat % error versus voltage. Increasing the voltage no longer decrease the uncertainty in heat flow.

A longer beam also has more resistance in the current conductor. This causes more heat to be generated. When the heat generated in the current conductor is greater than the heat that should be delivered to the object under test, the probe must have a counter heat flow (the measured heat flow) that reduces the heat flow to the object. This subtraction of two large values causes a large uncertainty on the result. It is for this reason that the beam length has an optimal value for a given operation condition.

In the equations that follow, a couple functions are used. The function Xspec gives the uncertainty in a measurement for a given instrument and measured value. The function mat_table gives the requested material property for a given substance.

| | | |
|---|---|---|
| L = 900e−6 [m] | | distance between 122 and 102 |
| I = 100e−6 [A] | | current through 160 |
| sI = Xspec(I, current source); | | uncertainty in the current above |
| Q = 2e−6 [W] | | Heat flow through the probe |
| a = 30e−6 [V/K] | | Seebeck coefficient of the thermocouple material pair |
| SiNx_width = | 8e−6 [m] | beam 191 width |
| SiNx_thick = | 1.9e−6 [m] | beam 191 thickness |
| ni_width = | 1e−6 [m] | Nickel lead 114 of thermocouple |
| ni_thick = | 80e−9 [m] | |
| cr_width = | 1e−6 [m] | Chromium leads 106 & 108 of thermocouple |
| cr_thick = | 60e−9 [m] | |
| I_width = | 2e−6 [m] | Current conductor 160 |
| I_thick = | 200e−9 [m] | |
| V_width = | 1e−6 [m] | Voltage sense wires 110 & 112 |
| V_thick = | I_thick; | |
| pho_e = mat_table('W', 'electrical_resistivity'); Current conductor | | |
| Re = pho_e.*L./(V_width.*V_thick); | | |
| Ve = I.*Re; | | |
| sVe = Xspec(Ve, voltmeter); | | |
| pho_th = mat_table('W', 'thermal_conductivity'); | | |

-continued

Rth_SiNx = L./(mat_table('SiNx', 'thermal_conductivity').*SiNx_width.*SiNx_thick);
Rth_tc = L./(. . .
    mat_table('Ni', 'thermal_conductivity').*ni_width.*ni_thick + . . .
    mat_table('Cr', 'thermal_conductivity').*cr_width.*cr_thick );
Rth_Vsense = L./(pho_th.*V_width.*V_thick);
Rth_Wire = L./(pho_th.*I_width.*I_thick);
Rth = L./(. . .
    mat_table('SiNx', 'thermal_conductivity').*SiNx_width.*SiNx_thick + . . .
    mat_table('Ni', 'thermal_conductivity').*ni_width.*ni_thick + . . .
    mat_table('Cr', 'thermal_conductivity').*cr_width.*cr_thick +. . .
    pho_th.*V_width.*V_thick + . . .
    pho_th.*I_width.*I_thick);
Rthp = 1./(1./Rth_SiNx + 1./Rth_tc + 1./Rth_Vsense + 1./Rth_Wire);
Vth = a.*(Q−1/2*I.^2.*Re).*Rth;
sVth = Xspec(Vth, voltmeter);
%Calibration portion
aRth = a.*Rth;
Ical = 100e−6*ones(n_X,n_Y);
sIcal = Xspec(Ical, current source);
dV1 = Re.*Ical;
sdV1 = Xspec(dV1, voltmeter);
dV2 = Re.*Ical;
sdV2 = Xspec(dV2, voltmeter);
Rcontact = 100 [Ohms]
dVc = Ical.*Rcontact;
sdVc = Xspec(dVc, voltmeter);
sW = W.*sqrt(. . .
    (sI./I).^2 + (sdVc./dVc).^2 );
Qcal = Ical.*(dVc+0.5* (dV1 + dV2));
sQcal = Ical.*sqrt(. . .
    (Qcal.*sIcal./Ical).^2 + . . .
    (sdVc).^2 + . . .
    (sdV1/2).^2 + . . .
    (sdV2/2).^2 );
QdTcal = 2e−6 [W]
Vth1T = aRth.*QdTcal;
sVth1T = Xspec(Vth1T, voltmeter);
Vth2T = aRth.*QdTcal;
sVth2T = Xspec(Vth2T, voltmeter);
Vth1I = aRth.*Qcal/2;
sVth1I = Xspec(Vth1I, voltmeter);
Vth2I = aRth.*Qcal/2;
sVth2I = Xspec(Vth2I, voltmeter);
aRthp = (Vth1T.*Vth2I./Vth2T + Vth1I)./Qcal;
%all together
saRth = sqrt(. . .
    (Vth2I.*sVth1T./(Qcal.*Vth2T)).^2 + . . .
    (Vth1T.*Vth2I.*sVth2T./(Qcal.*Vth2T.^2)).^2 + . . .
    (Vth1T.*sVth2I./(Qcal.*Vth2T)).^2 + . . .
    (sVth1I./Qcal).^2 + . . .
    ( (Vth1T.*Vth2I./Vth2T + Vth1I).*sQcal./Qcal.^2).^2 );
%End Calibration portion
Qj = I.^2.*Re;
Qm = Q − 1/2*Qj;
sQ = sqrt(. . .
    (Qm).^2.*( (sVth./Vth).^2 + (saRth./aRth).^2 ) + . . .
    (1/2*Qj).^2.*( (sVe./Ve).^2 + (sI./I).^2 ) );

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of obtaining at least one thermoelectric characteristic of a scanning heat flow probe, the method comprising:

placing two scanning heat flow probes each having proximate and distal ends of cantilever structures in contact with each other at the distal ends;

establishing a temperature gradient between the proximate ends of the two probes;

measuring thermocouple junction voltages in each of the two probes;

establishing a current through the two probes;

measuring voltage drops in each of the two probes; and deriving a product of thermocouple Seebeck coefficient and cantilever structure thermal resistance from the measured voltages.

2. The method as recited in claim 1, wherein the thermocouple junction voltages correspond to temperature drops through each of the probes.

3. The method as recited in claim 1, wherein the voltage drops correspond to the Joule heating in each of the probes.

4. The method as recited in claim 1, wherein said deriving step relates voltage drops to heat flow.

* * * * *